US010079897B2

(12) United States Patent
Cortes Gomez

(10) Patent No.: US 10,079,897 B2
(45) Date of Patent: Sep. 18, 2018

(54) CONTROL OF A CHAIN OF SERVICES

(71) Applicant: Telefonaktiebolaget LM Ericsson (publ), Stockholm (SE)

(72) Inventor: Francisco Cortes Gomez, The Hague (NL)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 185 days.

(21) Appl. No.: 15/032,128

(22) PCT Filed: Oct. 29, 2013

(86) PCT No.: PCT/EP2013/072565
§ 371 (c)(1),
(2) Date: Apr. 26, 2016

(87) PCT Pub. No.: WO2015/062627
PCT Pub. Date: May 7, 2015

(65) Prior Publication Data
US 2016/0308981 A1 Oct. 20, 2016

(51) Int. Cl.
H04L 29/08 (2006.01)
H04L 12/46 (2006.01)
(Continued)

(52) U.S. Cl.
CPC .......... H04L 67/16 (2013.01); H04L 12/4633 (2013.01); H04L 41/083 (2013.01);
(Continued)

(58) Field of Classification Search
CPC . H04L 12/4641; H04L 12/4633; H04L 41/08; H04L 41/0803; H04L 41/083;
(Continued)

(56) References Cited

U.S. PATENT DOCUMENTS

2013/0003735 A1 1/2013 Chao et al.
2013/0272305 A1* 10/2013 Lefebvre ............... H04L 47/24
370/392

(Continued)

OTHER PUBLICATIONS

Boucadair et al., "Differentiated Network-Located Function Chaining Frameword", Network Working Group, Internet-Draft, Intended status: Standards Track, Jul. 3, 2013, 20 pp.
(Continued)

Primary Examiner — Ruolei Zong
(74) Attorney, Agent, or Firm — Sage Patent Group

(57) ABSTRACT

A service control entity is configured to control chains of services provided in a service network having a plurality of service providing modules. A data packet flow from a source address to a destination address is transmitted through the service network applying a chain of services. A chain control unit determines possible chains of services to be applied, identifies the predefined sequence of services applied to the data packet flow, and identifies in which order the identified service providing modules have to be passed in order to apply the predefined sequence of services. A module control unit assigns, to each of the service providing modules in the chain of services, an ingress network address of an underlying layer of the end-to-end layer. The module control unit assigns ingress network addresses so that they have a predefined relationship to the ingress network address of a neighboring service providing module.

20 Claims, 12 Drawing Sheets

(51) Int. Cl.
*H04L 29/12* (2006.01)
*H04L 12/721* (2013.01)
*H04L 12/725* (2013.01)
*H04L 12/24* (2006.01)

(52) U.S. Cl.
CPC ........ *H04L 41/0826* (2013.01); *H04L 45/306* (2013.01); *H04L 61/35* (2013.01); *H04L 61/6022* (2013.01); *H04L 67/327* (2013.01); *H04L 45/38* (2013.01); *H04L 61/6095* (2013.01)

(58) Field of Classification Search
CPC ....... H04L 45/306; H04L 61/35; H04L 67/16; H04L 67/125; H04L 67/142
USPC ........................................................ 709/223
See application file for complete search history.

(56) References Cited

U.S. PATENT DOCUMENTS

2014/0010085 A1* 1/2014 Kavunder ......... H04W 28/0215
370/235
2015/0063102 A1* 3/2015 Mestery ................. H04L 41/12
370/230
2015/0071285 A1* 3/2015 Kumar ................. H04L 45/306
370/392
2015/0092551 A1* 4/2015 Moisand ............. H04L 12/4633
370/235

OTHER PUBLICATIONS

Jiang et al., "An Architecture of Service Chaining", Internet Working Group, Internet Draft, Intended status: Informational, Jun. 27, 2013, 11 pp.
International Search Report and Written Opinion of the International Searching Authority, Application No. PCT/EP2013/072565, dated Jun. 27, 2014.
Chiosi et al., Introductory White Paper—"Network Functions Virtualisation: An Introduction, Benefits, Enablers, Challenges & Call for Action", *SDN and OpenFlow World Congress*, Darmstadt, Germany, Oct. 22-24, 2012, 16 pp.
McKeown et al., "OpenFlow: Enabling Innovation in Campus Networks", *ACM SIGCOMM Computer Communication Review*, vol. 38, No. 2, Apr. 2008, pp. 69-74.
NFV ETSI Industry Specification Group, "Network Functional Virtualisation; Use Cases;" GS, NFV 009 V012 (Aug. 2013), 54 pp.

* cited by examiner

TVAS-A: MAC(02:00:00:00:00:00)
TVAS-B: MAC(02:00:00:00:00:01)
POI-A: MAC(02:00:00:00:00:02)

TVAS-A: MAC(02:00:00:00:00:11)
TVAS-B: MAC(02:00:00:00:00:10)
TVAS-C: MAC(02:00:00:00:00:12)
POI-A: MAC(02:00:00:00:00:13)

FIG. 5

TVAS-A:  MAC(02:80:00:00:00:01)
TVAS-B:  MAC(02:80:00:00:00:00)
GW-A:    MAC(02:80:00:00:00:02)

TVAS-A:  MAC(02:80:00:00:00:11)
TVAS-B:  MAC(02:80:00:00:00:12)
TVAS-C:  MAC(02:80:00:00:00:10)
GW-A:    MAC(02:80:00:00:00:13)

FIG. 6

TVAS-A-1: MAC(02:00:00:00:00:00) & MAC(02:40:00:00:00:00)
TVAS-A-2: MAC(02:80:00:00:00:00) & MAC(02:C0:00:00:00:00)
TVAS-B:   MAC(02:00:00:00:00:01) & MAC(02:40:00:00:00:01)
          MAC(02:80:00:00:00:01) & MAC(02:C0:00:00:00:01)
POI-A:    MAC(02:00:00:00:00:02) & MAC(02:40:00:00:00:02)
          MAC(02:80:00:00:00:02) & MAC(02:C0:00:00:00:02)

TVAS-A-1: MAC(02:00:00:00:00:11) & MAC(02:40:00:00:00:11)
TVAS-A-2: MAC(02:80:00:00:00:11) & MAC(02:C0:00:00:00:11)
TVAS-B:   MAC(02:00:00:00:00:10) & MAC(02:40:00:00:00:10)
          MAC(02:80:00:00:00:10) & MAC(02:C0:00:00:00:10)
TVAS-C:   MAC(02:00:00:00:00:12) & MAC(02:40:00:00:00:12)
          MAC(02:80:00:00:00:12) & MAC(02:C0:00:00:00:12)
POI-A:    MAC(02:00:00:00:00:13) & MAC(02:40:00:00:00:13)
          MAC(02:80:00:00:00:13) & MAC(02:C0:00:00:00:13)

FIG. 7

CONTROL OF A CHAIN OF SERVICES

CROSS REFERENCE TO RELATED APPLICATION

This application is a 35 U.S.C. § 371 national stage application of PCT International Application No. PCT/EP2013/072565, filed on Oct. 29, 2013, the disclosure and content of which is incorporated by reference herein in its entirety. The above-referenced PCT International Application was published in the English language as International Publication No. WO 2015/062627 A1 on May 7, 2015.

TECHNICAL FIELD

The invention relates to a service control entity configured to control chains of services provided in a service network in which a plurality of service providing modules are provided, and to a method to control the chains of services by the service control entity. The invention furthermore relates to the service providing module configured to provide a service to a data packet flow and to a method to provide the service by the service providing module.

BACKGROUND

The general architecture of service access providers is shown in FIG. 1. Data traffic between an end-user (not shown) and the internet 30 or any other data network (PDN) passes a service network 10, where the data traffic is processed by one or several service providing modules. Access networks 51, 52, 53 such as 2G/3G, LTE and fixed line access networks are connected to a gateway 40. Depending on the access type, this can be a BNG (Border Network Gateway), GGSN (Gateway GPRS Support Node) or a PGW (Packet Gateway). At an activation of a data packet flow, the gateway provides end-users with an IP address. It handles authentication, accounting and charging and it may perform additional tasks like acting as PCEF (Policy and Charging Enforcement Function) in 3GPP networks. The gateway 40 is the entry point to the service network which refers in this application to an operator controlled network with one or multiple modules attached providing services that add value to the operator or to the end-user. Examples of said services are firewalls, HTTP header enrichment or content filtering modules.

As shown in FIG. 1, the operator's demarcation towards the internet is a point of interconnect 20 (PoI), since the IP address allocated to the end-user is typically a private IP address, a network address translation 21 (NAT) to a public IP address is usually performed close to the PoI 20.

With current technologies, the allocation value added services in service networks is inflexible. Processing end-user data traffic or data flows based on their type, source or destination by selected services is only possible to a limited extent at the cost of complex network and service configurations.

Telecommunication networks often include a number of Transparent Value Added Services (TVAS), also named service providing modules, which transparently process traffic traversing them. In the logical network architecture as shown in FIG. 1 TVAS are connected and belong logically to the Service Network.

With "classical" service network, a network composed of transport infrastructure and hardware appliances implementing the services, is meant, where the main purpose of the majority of the hardware components used is to support the execution of the services and the steering of the traffic through them.

The term "transparent" is used in this case to refer to traffic processing functions which are not explicitly addressed by the traffic itself in any way, and that are under the sole control of the telecommunications provider. This is opposed to functions like DNS (Domain Name Server)-steered CDN (Content Delivery Network) servers, configurable HTTP proxies or services implemented by IMS (IP Multimedia Subsystem) and explicitly addressed via SIP (Session Initiating Protocol). So "transparent" means that a user requesting a data packet flow is not aware of the provided service and does not directly address the service.

It shall be noted that the terms "value added service" is to be given a very broad interpretation including real and potential added value which may be value for the end-user, value for the network provider, or potentially for other parties.

Examples of services provided by TVAS could be:
Firewalls
Spam filters/Antivirus
Content Filtering
Parental Control
Transparent Internet Caches
HTTP Header enrichment
Deep Packet Inspection The main reason for the distinction of TVAS versus non-transparent VAS is that the transport network plays a central role in the usage of TVAS as it is the only entity able to direct traffic to one TVAS or node. The communication endpoints can, by definition of "transparent", not steer the usage of a TVAS. In the same way, most existing TVAS do not implement any awareness of other potential TVAS or chaining among them and can therefore not steer traffic to another TVAS.

At the same time, the need for TVAS to be deployed in legacy networks has resulted in strong dependencies between the service implementation itself and the transport network, with current TVAS products often being based on networking appliance platforms or making use of such. Examples of these dependencies are:
TVAS on high throughput routing/switching platforms due to the need for all traffic to traverse them despite of only a fraction of it being really processed
Need for high-availability comparable to transport equipment even though the service itself does not require such high-availability. It shall be ensured that traffic sent via a TVAS is not dropped due to a TVAS failure.
Integrated NAT/NAPT (Network Address and Port Translation) functionality to steer return traffic back to the same function
Strong integration with load balancing functions in cases where stateful TVAS functions require smart load balancing to the right instance. This may result in TVAS product including both load balancers as component, or creating limitations like maximum number of instances or strict connectivity requirement between load balancers and TVAS servers One approach to steer traffic through a chain of TVAS or service providing modules is to control the uplink and downlink traffic using software-defined network technologies without NAPT (Network Address and Port Translation).

As shown in FIG. 2, the idea is to control the TVAS 81, 82 chain by a central controller 70. As shown in FIG. 2, all TVASs 81, 82, the gateway 40 and the PoI 20 are connected to an OpenFlow network. The controller 70 provides paths through the OpenFlow network for every data flow, identified by its five-tuple (source IP address, destination IP address, source port, destination port and protocol number). The OpenFlow switches 61, 62, 63 base the forwarding decision mainly on matching the five-tuple information with entries in their flow tables. If no match is found, the packet is forwarded to the controller 70 for analysis. In turn the controller configures a bidirectional path through the OpenFlow network 60. By that traffic steering in the Service Network can be achieved on a per data flow base.

There is a clear trend in the industry to move services and applications from dedicated hardware appliances to virtualized environments in data centers. Vendors of virtually all types of software centric products, and in particular of TVAS, are requested in RFx:s (Request for [Information, Proposal, Quotation, Bid]) to provide their products as virtual appliances.

While there are some TVAS which are very data plane processing intensive, which may incur significant performance degradation if deployed as virtual appliances, there are others which are very likely to be extensively deployed as such in the near future. Even for those being very data plane processing intensive, it is likely that they will also be eventually virtualized, if not to typical data-center COTS (Components Off The Shelf) hardware, at least to yet-to-come hardware architectures designed to support the efficient virtualization of exactly such kind of applications and services.

It is expected that the virtualization of TVAS will have a direct impact on how service chaining is implemented. The following factors can have decisive impacts:
  Virtual TVAS (vTVAS) will be deployable/instantiable on different data center blades and in different "sizes" at a low cost and as decided by an orchestration system. This enables possibilities like:
    Dedicating instances to specific service chains (so that there is no need any more to reclassify traffic coming out of such a TVAS instance)
    Choosing the location of the instances so that all TVAS instances for the same chain are collocated, or located close to each other
    Creating virtual network topologies linking those TVAS instances so that legacy routing/forwarding mechanism can handle the traffic steering
  The process of virtualizing legacy services and applications will require some software development, and while doing this, it is expected that the virtualized versions of legacy bare-metal TVAS can get additional functionality, like:
    Preservation of VLAN tags from ingress to egress
    Variability in the "size" (characteristics, admissible load) of the instances with direct dependency to computing resources like CPU performance and memory capacity
    Providing feedback/information about current load in order to enable automatic scaling out and in by adding or removing instances to adapt to varying capacity needs.
  According to the Network Function Virtualization (NFV) initiative ("Network Functions Virtualization, An Introduction, Benefits, Enablers, Challenges and Call for Action", SDN and OpenFlow SDN and OpenFlow World Congress, October 2012), even the entity demarcating the ingress into service chaining (typically the GGSN or PGW in mobile networks and the BNG in fixed networks) may move into data centers as virtualized appliances.

The SDN based traffic steering methods used for legacy TVAS are very powerful, but also complex and costly due to their demands on the SDN-controlled data-plane devices, on the SDN controller and on the source NAPT devices. Scalability and the doubts about the ability to handle high bandwidth at wire line speed are also a problem.

The virtualization of TVAS thus bring the potential of high efficiency simplification improvement which are not leveraged by current SDN based solution. Approaches to simplify service chain by leveraging TVAS changes related to the upcoming virtualization process or applicable to fully new virtual TVAS products are very conservative and restricted to add modifications like the preservation of VLAN tags, or more generic tags or labels, in order to facilitate the usage or to improve the efficiency of legacy traffic steering methods.

In the case of just leveraging the preservation of tags, the resulting SDN based methods get a quantitative improvement by reducing the needs for service respecification after each virtual TVAS, but they share the architecture complexity and a significant part of the costs discussed above.

Approaches based on creating dedicated instances for every single chain and using cloud orchestration to both create a virtual topology enforcing the traffic steering and to get the traffic flows to efficiently use the underlying physical topology imply a high number of disadvantages and trade-offs which are likely to result in inefficient use of processing power and in complexity. Examples of such disadvantages and trade-offs are:
  Different TVAS, due the nature of the service they implement, may present huge differences in the amount of flows that can be handled per unit of computing power or memory capacity. vTVAS instantiation per chain may result in extremely underutilized vTVAS instances
  Some TVAS require cooperation/synchronization among instances to achieve their goals (example: transparent caches, content delivery networks, botnet-attack detection). A high number of underdimensioned vTVAS can result in high inefficiencies.
  If there is a need to include a non-virtualized TVAS (as mentioned above, for very data-plane intensive services, their virtualization may come much later than for others or maybe never), a dedicated hardware appliance for each chain would be needed, or the method would have to get combined with one of the legacy methods described above and inherit all its disadvantages.

Although not explicitly described in previous paragraphs, it would also be possible to implement inside the TVAS awareness about service chaining and about neighbor TVAS including their number (different TVAS and different instances) and their addresses, so that they can explicitly send traffic to the next TVAS in the chain and react to additions, removals or other changes in the service chains. While possible, the degree of complexity would be quite high and it is very unlikely that it would ever be successfully implemented in a multivendor manner.

Accordingly a need exists to avoid at least some of the above-mentioned drawbacks when a data packet flow is passed through a chain of services and to provide a possibility to effectively control the passing of data flows through a chain of services.

SUMMARY

This need is met by the features of the independent claims. Further embodiments are described in the dependent claims.

According to a first aspect of the invention, a service control entity is provided configured to control chains of services provided in a service network in which a plurality of service providing modules are provided. Data packets of a data packet flow from a source address to the destination address are transmitted through the service network to apply a chain of services to the data packet flow, wherein in a chain of services a predefined sequence of services is applied to the data packet flow, wherein an end-to-end layer is used to steer the data packet flow from the source address to the destination address. Different data packet flows can be transmitted through the service network to apply a flow dependent chain of services to the corresponding data packet flow. The service control entity comprises a chain control unit configured to determine the possible chains of services to be applied to the different data packet flows and configured to identify, for each chain of services, the predefined sequence of services applied to the data packet flow when passing through the corresponding chain of services. The chain control unit is further configured to identify, for each chain of services, the service providing modules which provide the services contained in the predefined sequence of services and is configured to identify in which order the identified service providing modules have to be passed in order to apply the predefined sequence of services to the data packet flow. A module control unit of the service control entity is configured to control the service providing module and is configured to assign, to each of the identified service providing modules contained in the chain of services, an ingress network address of an underlying layer of the end-to-end layer, the underlying layer being used in the service network to direct the data packet flow to the next service providing module of the chain of services. The module control unit, for each of the service providing modules in the chain of services, assigns ingress network addresses to the service providing modules used in the corresponding chain of services in such a way that the ingress network address of the service providing module and the ingress network address of a neighboring service providing module, which is the subsequent service providing module in the corresponding chain of services, are related to each other by a predefined relationship. The service control entity further comprises a transmitter configured to inform a service chain classification unit, which identifies the data packet flows entering the service network and identifies the service chain to be applied to each data packet flow, of the ingress network address of the first service providing module provided in each chain of services.

The service control entity knows in which order the different service providing modules have to be passed in order to apply a certain chain of services. The service control entity furthermore controls the service providing modules in such a way that it assigns the ingress network addresses to the service providing modules contained in a chain of services which follow a predefined relationship. Furthermore, each service chain classification unit is informed of the ingress network address of each entry point in the different chains of services so that the service chain classification unit only needs to forward data packets of a data packet flow to the first service providing module of the identified chain.

As the ingress network addresses from neighboring service providing modules follow the predefined relationship, the service providing modules, with the knowledge of the predefined relationship can direct the data packet flow to the next service providing module in the chain.

It is possible that the module control unit is configured to use a predefined range of the possible network addresses of the underlying layer for assigning ingress network addresses. Furthermore, the module control unit can be configured to use, within the predefined range, a sub-range of the predefined range for each of the possible chains of services. A sub-range can be a subset or part of the predefined range. For each possible chain of services, a part or subset of the predefined range is used. Each chain of services uses a chain-specific subset of the network addresses of the underlying layer to define the chain of services.

The ingress network address of the underlying layer may be the Ethernet MAC address (Medium Access Control). In another embodiment, the ingress network address of the underlying layer is an encapsulated end-to-end layer address added to the data packet flow.

The module control unit may control the service providing modules, in each of the chain of services, in such a way that the service providing modules use the predefined relationship to modify the ingress network address of the underlying layer contained in the data packets of the received data packet flow based on the predefined relationship and use the modified ingress network address, modified according to the predefined relationship, as destination network address of the underlying layer to forward the data packet flow to the next service providing module in the chain of services.

In this embodiment, the different service providing modules in a chain of services use the predefined relationship and determine the destination network address of the next service providing module in the chain by applying the predefined relationship to the ingress network address in order to generate the destination network address to which the data packets should be forwarded. Once the data packet flow is forwarded to the first service providing module in a chain of services, each of the service providing modules can, without the need of further instructions from the outside, determine where the data packet flow should be sent to. This applies to all service providing modules of a chain except the last one in a chain.

The module control unit may control the last service providing module passed by the data packet flow in each chain of services in such a way that the last service providing module in each chain of services discards the ingress destination address in the data packets of the received data packet flow and forwards the packets of the received data packet flow taking into account the destination address of the end-to-end layer. This last service providing module thus handles the traffic as a classical routing device. Instead of amending the ingress network address for the determination of the destination address, the data packets are routed according to forwarding rules of the end-to-end layer, e.g. layer 3 IP forwarding rules.

The end-to-end layer can be the third layer of the known OSI layer structure, the underlying layer being the second layer of the OSI layer model.

Within the predefined range of possible network addresses of the underlying layer, the module control unit may use at least one of the following parts: a part within the predefined range of possible network addresses which indicates that the network address of the underlying layer is locally administered within the service network, a further part within the predefined range may be used to indicate the flow direction of the data packet flow within the service network. A third part may be used to identify the chain of services and, last but not least, a fourth can contain the network addresses of the underlying layer used by a chain of services. The last or fourth part corresponds to the sub-range or subordinate range and contains the network addresses used by the service providing modules, thus ingress network address.

It is possible that within a service chain several service providing modules are used to provide a single service, e.g. for load balancing. In this context, the chain control unit can determine, in each chain of services, the maximum number of service providing modules which are used within a chain of services to provide a single service. The module control unit then assigns to the first service providing module in each chain of services, as many ingress network addresses as the determined maximum number of service providing modules. This makes the use of several service providing modules in a chain of services easy. For each service providing module providing the same service, a different ingress network address is assigned to the first service providing module of the chain so as many different chain of services exist as service providing modules providing a single service. As can be seen from the above, several ingress network addresses of the underlying layer may be assigned to a single service providing module.

The invention furthermore relates to the corresponding method carried out by the service control entity, wherein according to one step of the method the possible chain of services to be applied to the different data packet flows are determined. Furthermore, for each chain of services the predefined sequence of services applied to the data packet flow is identified when passing through the corresponding chain of services. Furthermore, for each chain of services, the service providing modules are identified which provide the services contained in the predefined sequence of services and it is identified in which order the identified service providing modules have to be passed in order to apply the predefined sequence of services to the data packet flow. Furthermore, an ingress network address of the underlying layer of the end-to-end layer is assigned to each of the identified service providing modules contained in the chain of services, wherein the network address of the underlying layer is used in the service network to direct the data packet flow to the next service providing module of the chain. The ingress network addresses are assigned to the service providing modules in the corresponding chain of services in such a way that the ingress network address of a service providing module and the ingress network address of the neighboring service providing module, which is the subsequent service providing module in the corresponding chain of services, are related to each other by the predefined relationship. Furthermore, the service chain classification unit is informed of the ingress network address of the first service providing module provided in each chain of services.

The invention further relates to the service providing module which provides the service to the data packet flow in the service network. The service providing module comprises a receiver configured to receive data packets of one of the data packet flows, the data packets including an ingress network address of the underlying layer of the end-to-end layer, which is used in the service network as ingress address to direct the data packet flow to the service providing module. The service providing module furthermore comprises a processing unit configured to process the data packets of the data packet flow in order to apply a service provided by the service providing module. The processing unit is configured, when applying the service to the data packets, to maintain the ingress network address of the underlying layer. An address calculation unit is provided configured to calculate the destination address of the underlying layer of the next service providing module to which the data packet flow is to be transmitted in the chain of services. The address calculation unit is configured to calculate the destination address based on the ingress network address of the underlying layer and based on a predefined relationship providing a relationship between the ingress network address contained in the data packets of the received data packet flow and the destination address of the underlying layer. A transmitter transmits the data packets of the data packet flow to the next service providing module in the chain of services using the calculated destination address of the underlying layer of the next service providing module.

The service providing modules preserve the ingress network address and use the latter to calculate the destination address to which a data packet flow is to be transmitted for the next service of the chain of services. The predefined relationship used to determine the destination address based on the ingress network address can be a very simple relationship, e.g. the service providing module may simply increase the network address by one. However, it should be understood that any other relationship may be used which relates the ingress network address of a first service providing module and the ingress network address of a second, neighboring service providing module in a chain of services. The service providing module modifies the destination address, be it the MAC address of the layer 2 frame or a layer 3 address of an encapsulated packet and uses the modified address as a destination address.

The receiver of the service providing module may be configured to pass up the ingress network address of the underlying layer to the end-to-end layer and the address calculation unit may pass the calculated destination address down to the underlying layer after the processing where it is used as destination address for the data packets of the data packet flow. The service providing module, instead of omitting the network of the underlying layer passes the network address up to the end-to-end layer. From the end-to-end layer, the calculated destination address is passed back to the underlying layer. The receiver can pass up the ingress network address of the underlying layer to the end-to-end layer wherein the address calculation unit passes the calculated destination address down to the underlying layer where it is used as destination address for the packets of the data packet flow.

The service providing module can furthermore comprise a port control unit configured to assign the network address of the underlying layer to a port of the service providing module wherein the port control unit assigns an ingress network address to one of the ports of the service providing module when a command is received for assigning a network address to a port including the ingress network address to be assigned.

The command may be received from the service control entity.

The transmitter may furthermore transmit the assigned network address to the forwarding entities of the service network, informing the forwarding entities of the service network of the port to which the network address was assigned. The assigned network address can be transmitted to the forwarding entities using gratuitous ARP messages to inform the layer 2 transport equipment of the location of the MAC when the assigned network address is the MAC address.

Instead of using a layer 2 MAC address, it is also possible to utilize encapsulation of the IP packets flowing between the different service providing modules. In this embodiment, the address calculation unit adds an encapsulated end-to-end layer address as destination address to the received data packets before the data packets of the data packet flow are transmitted to the next service providing module in the chain of services based on the encapsulated end-to-end layer address. Furthermore, the address calculation unit is configured to remove the encapsulation in the data packets of the received data packet flow before the service is applied to the data packets of the received data packet flow.

The invention furthermore relates to the corresponding method to provide a service by the service providing module. In this method, the data packets of the data packet flows are received, the data packets including an ingress network address of an underlying layer of end-to-end layer which is used in the service network as ingress address to direct the data packet flow to the service providing module. Furthermore, the data packets of said one data packet flow are processed in order to apply the service provided by the service providing module, wherein the ingress network address of the underlying layer is maintained after the processing. Furthermore, a destination address of the underlying layer of the next service providing module is calculated to which the data packet flow is to be transmitted in the chain of services. The destination address is calculated based on the ingress network address of the underlying layer and based on the predefined relationship providing the relationship between the ingress network address contained in the data packets of the received data packet flow and the destination address of the underlying layer. Furthermore, the packets of the data packet flow are transmitted to the next service providing module in the chain of services using the calculated destination address of the underlying layer of the next service providing module.

The features mentioned above and the features yet to be explained below may not only be used in isolation or in combination as explicitly indicated, but also in other combinations. Features and embodiments of the present invention may combined unless explicitly mentioned otherwise.

BRIEF DESCRIPTION OF THE DRAWINGS

Various features and embodiments of the present invention will become more apparent when read in conjunction with the accompanying drawings. In these drawings, FIG. 5 shows a first example of two different chains of services and the related MAC addresses, FIG. 6 shows another example of MAC addresses used in a chain of services used in connection with bidirectional service chains, FIG. 7 shows two tables with MAC addresses in a chain of services in which different service providing modules provide the same service.

DETAILED DESCRIPTION

Figure 1:
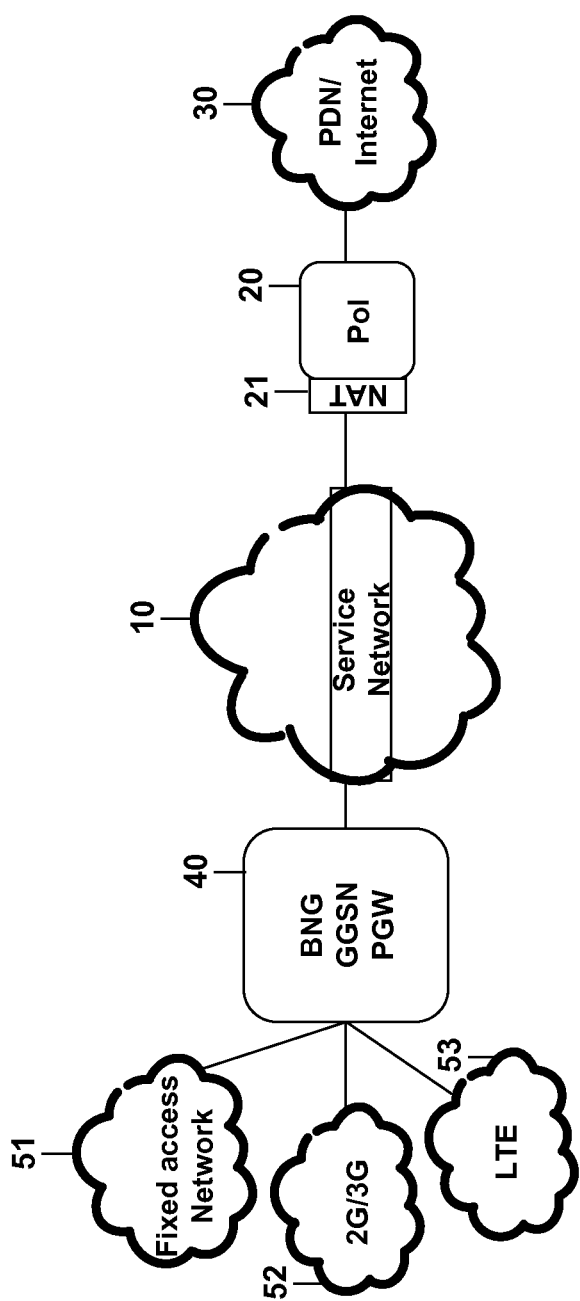
FIG. 1 shows a network architecture of service access providers.
Figure 2:
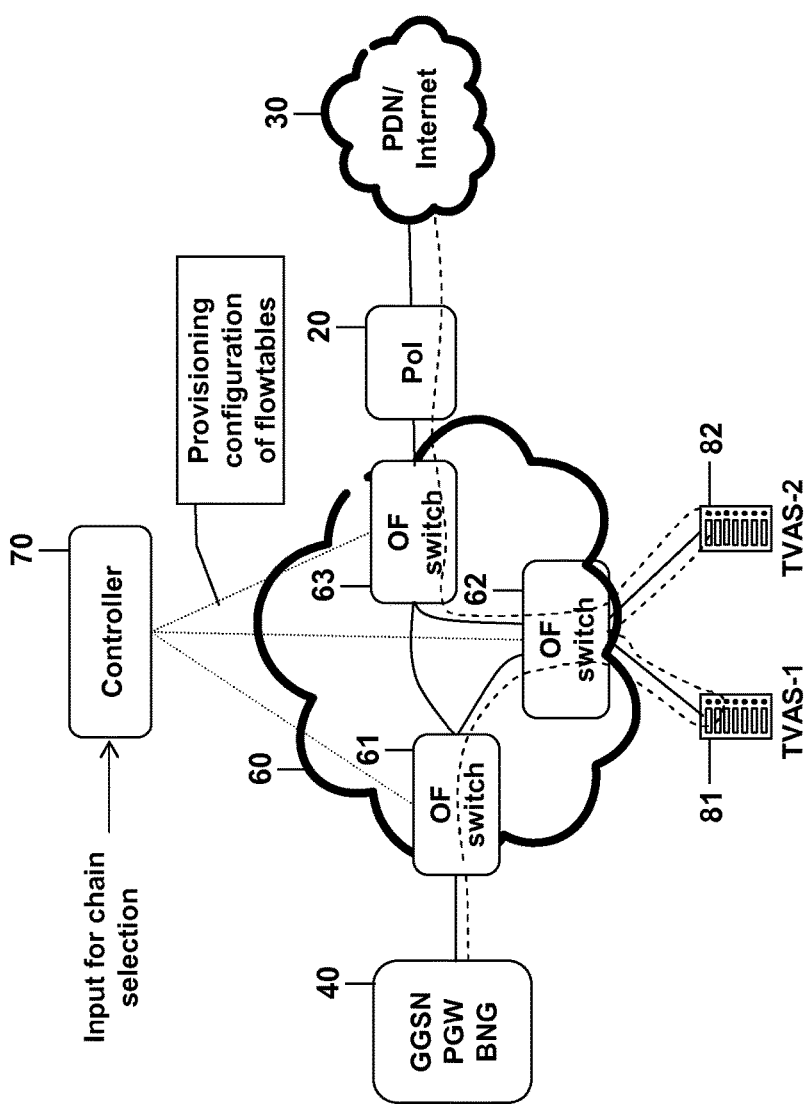
FIG. 2 shows a traffic steering in a software-defined network.

In the following, the invention will be described in detail with reference to the accompanying drawings. It needs to be understood that the following description of embodiments is not to be taken in a limiting sense. The drawings are to be regarded as being schematic representations and elements illustrated in the drawings are not necessarily shown to scale. Rather the various elements are represented such that their function and general purpose become apparent for a person skilled in the art. Any connection or coupling between functional blocks, devices, components or functional units shown in drawings may be implemented by an indirect connection or coupling. A coupling between components may also be established over a wireless connection, unless explicitly stated otherwise. Furthermore, functional blocks may be implemented in hardware, firmware, software or a combination thereof.

Figure 3:
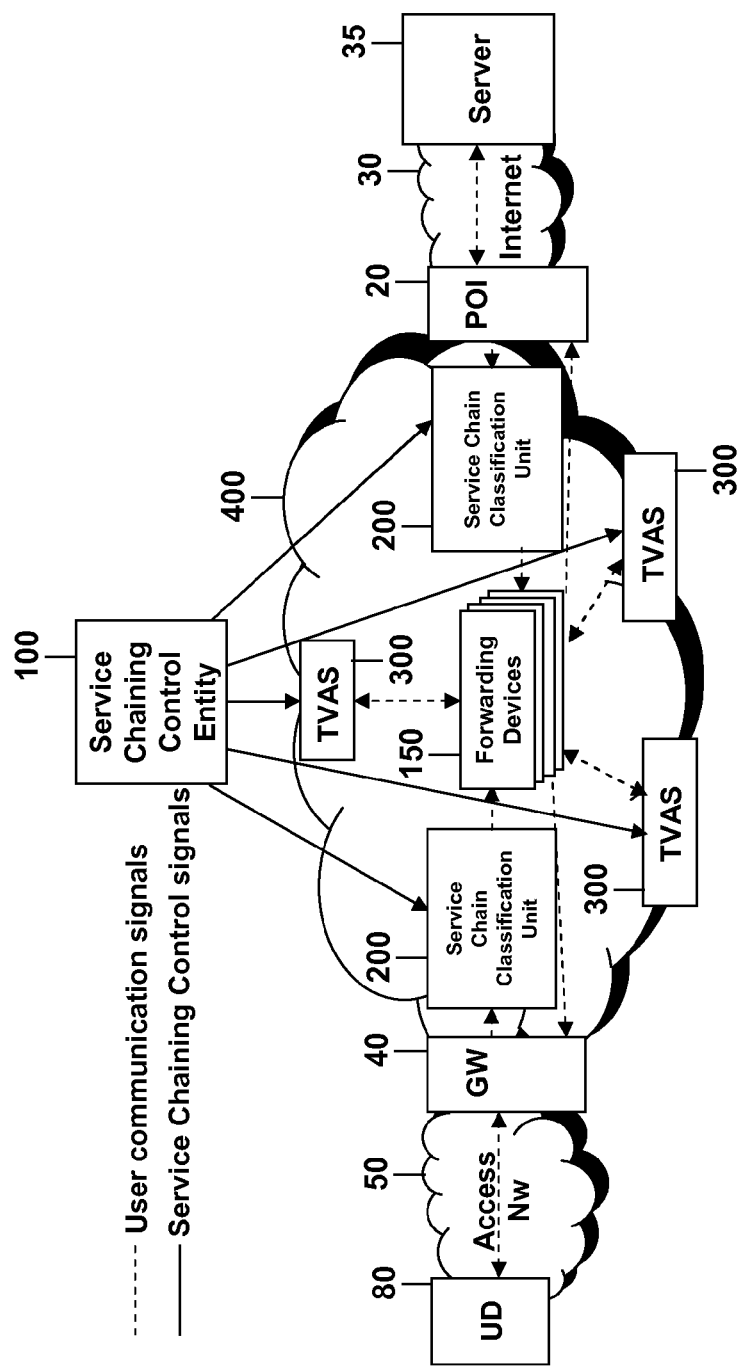
FIG. 3 shows the control of a data packet flow to apply a service chain incorporating features of the invention.

FIG. 3 shows the system architecture in which the invention may be used. A service control entity 100 is provided which controls different service providing modules, named TVAS 300 in FIG. 3. A user device 80 may request a data packet flow from a server 35. The data traffic from server 35 passes the internet 30, reaches the point of interconnect PoI 20 and enters the service network 400 where service chain classification units 200 are provided which classify the incoming data packets or frames into different chains of service based on their service characteristic. As will be explained in detail further below, the service chain classification units 200 furthermore send the data packet flow to the first MAC address for the chosen service chain. The service providing units 300 provide a service such as firewall, spam filter, content filtering, parental control, deep packet inspection, etc. The service providing modules 300 are attached to forwarding devices 150. When data packets of the data packet flow are passed through different service providing modules, the data packets are transmitted to the forwarding devices, where the data packet flow is passed through the attached service providing module. In the downlink direction, when the data packet flow leaves the service network, the data packets pass through gateway 40 and the access network 50.

In the following we will discuss some of the main steps carried out by the service chain control entity and the service providing modules 300, wherein the Ethernet MAC address is used as ingress network address. However, as will be specified further below, instead of using the MAC address, an address of a layer above the MAC address may be used by adding encapsulation. In FIG. 3, an end-to-end layer is used to steer the traffic from the user device 80 to the server 35 and in the other direction from the server 35 to the user device 80. This network address is an end-to-end layer address providing connectivity between nodes connected to a network with a common or translatable addressing scheme. In the service network 400, the underlying layer below the end-to-end layer is used to direct the traffic to the different service providing modules 300 or forwarding devices 150. When the underlying layer is used to provide connectivity between neighboring nodes, this means that it does not necessarily mean a physical neighborhood. The connectivity between neighboring nodes might make use of the same technologies as other end-to-end layers since it is the case when tunneling is used in IP or MPLS (Multi Protocol Label Switching) networks. The service control entity 100 reserves a range of Ethernet MAC addresses, basically a subset of the whole range of locally administered unicast addresses, i.e. a first in octet the form xxx xxx10. This predefined range of possible network addresses is then further split into smaller ranges or sub-ranges which are used for the different chains of services provided in the service network 400. The service control entity 100 is aware of the possible chains of services that may be applied to data packet flows in the service network 400. The service chain classification unit 200 at the ingress of the service chaining domain sends the packet to the first MAC address reserved for the chain of services resulting from the classification process. The service control entity 100, for each of the service providing modules 300 assigns to an ingress port of the service providing module 300 a MAC address from the chain-specific MAC subset in the same order as the service providing modules are traversed. In this context, one may note that one service providing module may have many different MAC addresses on the same ingress port. In the service providing module, the destination Ethernet MAC address is preserved from the ingress packets through the service providing module and the value of the preserved MAC address is amended using a predefined relationship, e.g. the value of the MAC address may be incremented by one and this address is then used by the egress to forward the data packets of a data packet flow to the next service providing module attached to one of the forwarding devices 150. The last service providing module in each chain, e.g. the one with the highest MAC address in the range of MAC addresses reserved for each chain, handles the traffic as a classical routing device. Instead of preserving and incrementing the ingress destination MAC address, it discards the address and routes the packet according to layer 3 IP forwarding rules.

It shall be noted that the chains of services described above are unidirectional, as opposed to the meaning of service chain in other known solutions. Bidirectional traffic is handled by applying the above-described steps for an uplink service chain and a downlink service chain, each using a different MAC subset in order to mimic methods known in the art where uplink and downlink traversal of a chain of services is symmetric, the two chains of services might include exactly the same service providing modules in the reverse order. However, other scenarios are possible where the uplink and downlink traversal is not necessarily symmetric.

Summarizing, the service control entity 100 implements the necessary logic to map chains of services to MAC address ranges, assigns and provisions the ingress MAC addresses at the corresponding TVAS or service providing entity and informs the service chain classification unit 200 which first MAC address to use for each chain of services. The PoI 20 is the point of interconnection at the boundary between the service network and the internet or external network through which the other endpoint of the end-user's end-to-end communication can be reached.

This service chain classification unit 200 classifies incoming packets or frames into different chains of services based on their service characteristics or policies and sends the packets to the first MAC address for the chosen service chain. This entity may be collocated within the gateway and/or the PoI 20 or it might be connected via the forwarding devices 150. In any case, any data packet traffic entering the service network 400 and requiring service chaining goes through this entity.

The forwarding devices 150 are fully unaware of service chaining and do forwarding using known mechanisms. In the above-described embodiment, the forwarding devices use Ethernet forwarding. In an alternative embodiment where IP tunnels might be used between two service providing modules, the forwarding modules forward or route the traffic based on the destination IP address of the tunnel.

Figure 4:
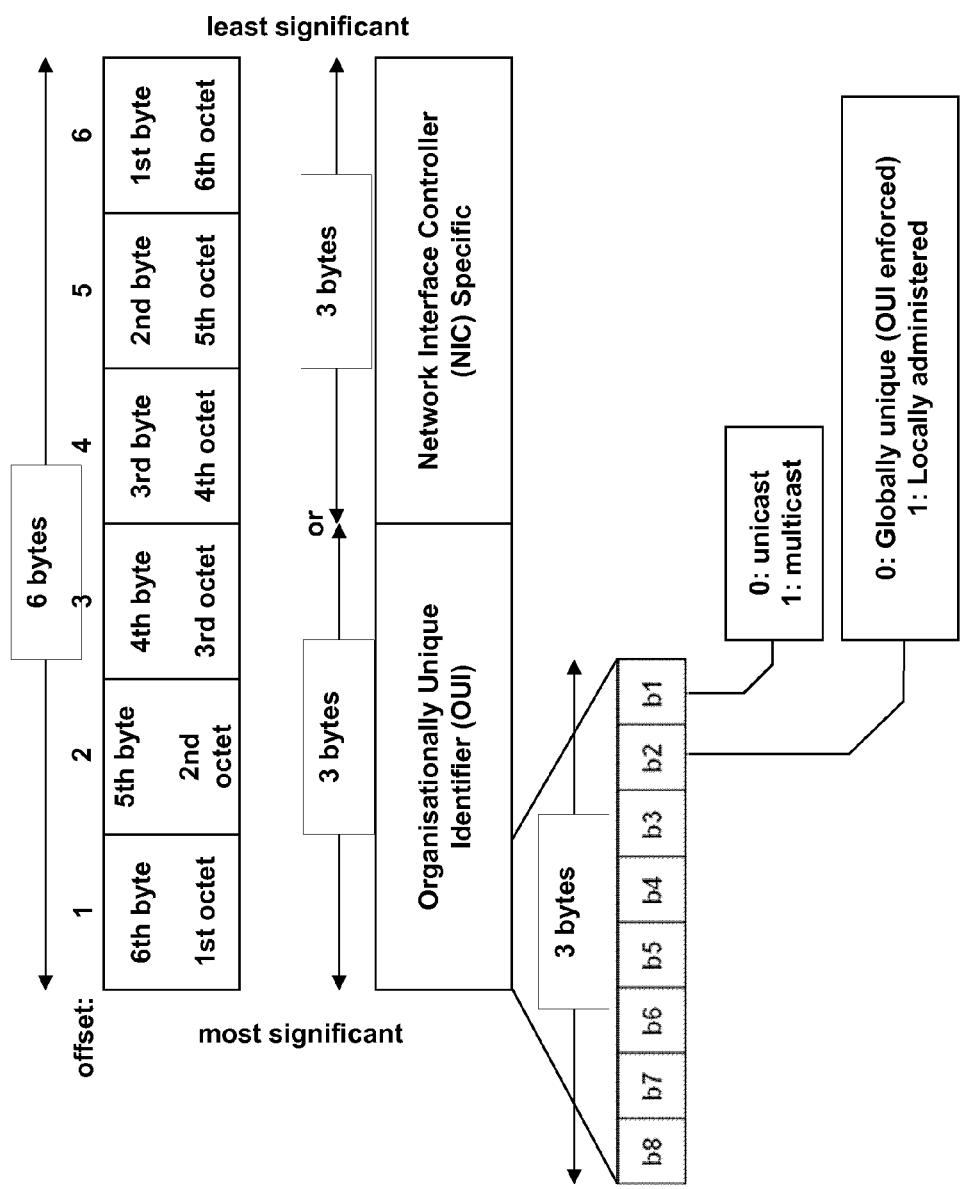
FIG. 4 shows a schematic view of a MAC address format.

In connection with FIG. 4, it is explained in more detail which part of a MAC address may be used by the invention to control a chain of services. As for FIG. 4, an Ethernet MAC address is 6 bytes or 48 bits long where the least significant bits of the first byte indicate if the address is unicast or multicast and if the address is globally unique or locally administered. In the following example, we assume that the full range of MAC addresses the first byte of which is 00000010 in a binary description is dedicated to service chaining. As can be seen from FIG. 4, the digit 1 in this sequence of digits indicates that it is a locally administered address. This furthermore implies a remaining range of 40 bits.

The next assumption is that a reasonable maximum number of service providing modules to be chained in one and the same service chain is 16, which requires 4 bits for encoding. According to these assumptions, a subset of 16 MAC addresses will be reserved for each service chain, following the following pattern:

Service Chain 0=>MACs 02:00:00:00:00:00 to 02:00:00:00:00:0f

Service Chain 1=>MACs 02:00:00:00:00:10 to 02:00:00:00:00:1f

. . .

Service Chain 1048576=>MACs 02:00:00:10:00:00 to 02:00:00:10:00:0f

This means that up to about 68 thousand million unidirectional service chains are supported, or about 34 thousand million bidirectional service chains. In connection with FIG. 5, two different service chains are shown. The first service chain comprises the service providing modules, TVAS-A, TVAS-B and PoI-A and the other service chain comprises the service providing modules TVAS-B, TVAS-A, TVAS-C and PoI-A. The service providing modules would get assigned the MAC addresses assigned to their uplink ingress interfaces for the two service chains as shown in FIG. 5. Please note that the MAC addresses shown in the present invention are mostly indicated in a hexadecimal form. In the example shown in FIG. 5, the last byte indicates the MAC addresses used per chain, whereas the digit 2 in the first byte shown in FIG. 5 indicates that the MAC address is locally administered. A possible chain of services could include the following chain of services: a Deep Packet Inspection Service, a Header Enrichment Service and a Firewall Service. Another example would be: Video Optimization Service, Network Address Translation Service, Content Filtering Service.

In the following, in connection with FIG. 6, the handling of bidirectional chains of service is explained in more detail.

First, to facilitate the correlation of uplink and downlink service chains applicable to the same traffic, in this example we use the $9^{th}$ bit of the MAC address (i.e. the most significant bit of the reserved range) to indicate uplink (0) or downlink (1), while keeping all other bits equal. This implies that the downlink service chain corresponding to Service Chain 0 would be Service Chain 0x800000000 [TVAS-B, TVAS-A, GW-A] and that corresponding to Service Chain 1 would be Service Chain 0x800000001 [TVAS-C, TVAS-A, TVAS-B, GW-A], which result in the corresponding instances having the MAC addresses assigned to their downlink ingress interfaces as shown in FIG. 6.

In the following, the traffic handling inside the service providing modules is discussed.

Within a service providing module, at arrival of a layer 2 frame whose content has to be processed by the service providing module, not only the layer 3 packet, which is necessarily passed to upper layers for processing is passed up, but also the destination layer 2 MAC address received with the packet is passed up. For layer 3 service providing modules, the requirement to pass layer 2 information to upper protocol layers may be unusual; however, it is used in the invention to determine the destination address of the next service providing module. In this context, it shall be noted that it is in the nature of a service providing module not to adhere to the layered networking rules. A service providing module, by definition, does process the content of the payload as a layer 7 application does, but it does fake the behavior of a layer 2 or layer 3 device, preserving or faking the headers at those layers.

The service providing module processing the packet in order to apply the requested service may, at the end of its processing work, increment the received layer 2 MAC address and pass it to the layer 2 of the protocol stack in order to use it as a destination address for the outgoing packet. This incrementation reflects the predetermined relationship which is used in the service providing module to determine the destination address. This predefined relationship may be implemented by a service control entity. However, the predefined relationship how the ingress network address is amended may also be directly implemented or preconfigured or manually configured within the service providing module to do the address calculation operation. Thus, it is not necessarily the service control entity which in a centralized way stores the predefined relationship in the service providing modules. The predefined relationship may also be preconfigured when the service providing module is designed or may be manually configured by an operator of the network.

The service providing modules may send several outgoing packets for a single incoming one, drop packets or combine several incoming packets into a different number of outgoing packets. In the example shown, the outgoing packets resulting from the processing of incoming packets with MAC address "A" shall leave the service providing module with a "A+1" as destination.

In case that the TVAS processing is non-invasive, i.e., it only reads the packets without ever applying any modification to the content, then the full invention can be easily implemented in the layer 2 part of the protocol stack, without any need to pass the MAC address information to upper layer's software.

It shall be noted that the TVAS has full freedom to change not only the content of the processed data, but also the IP header. Applying network address translation (NAT), tunneling or any other mechanism affecting the IP header does not prevent service chaining from keeping the packets going through the correct TVAS chain. This is a big advantage versus legacy mechanisms.

An example of how a TVAS can leverage this flexibility can be easily given for the type of TVAS working as HTTP proxies. A first generation HTTP proxy as defined by IETF RFC 2068 works by configuring the UE HTTP client to use the IP address of the HTTP proxy as IP destination, which then uses a different HTTP connection and an IP address owned by the HTTP proxy as source towards the other end's HTTP server. As this type of proxies requires modification of the UE (User Entity) HTTP client and as the client can then easily bypass the proxy if so wished, many modern HTTP proxies fall in the category of TVAS and work as transparent proxies, also known as an intercepting proxies, inline proxies, or forced proxies. A transparent proxy intercepts normal communication at the network layer without requiring any special client configuration. Now, transparent proxies can implement different levels of "transparency"

1. The "Semi Transparent" mode is only transparent on the client side (faking the ownership of the IP address of the server), while it uses its own address on the server side. This mode has important advantages like reducing resource usage at the proxy and allowing more efficient communication towards servers handling multiple flows. It might also be used to provide a certain degree of anonymity to users or to avoid the need for Network address translation. But this mode does not work with most current service chaining solution because the packets traversing a Semi-Transparent proxy do not preserve the IP header and therefore they cannot be identified by many service chaining solutions as belonging to the same flow.

2. The "Fully Transparent" mode, where the proxy is transparent on both sides, also faking the IP address of the client in its communication with the server. This requires a more complex and less efficient implementation, but it is a deployment mode supported by some products as it is the only way to make the usable in many current service chaining solutions.

For SND-based service chaining solutions, only the "Fully Transparent" mode is usable. The "Semi Transparent" deployment mode would break the solution and such a TVAS could not be used. It shall be noted that removing the transparency requirement on the server side may have significant advantages like enforcing downlink traffic coming back without putting additional requirements on the network and performance or resources-usage improvements.

Referring back to the service control entities which provide the chains of services, the service control entity 100 of FIG. 3 assigns the MAC addresses to the ingress interfaces of the corresponding service providing modules.

The assignment itself implies binding those MAC addresses to a virtual NIC (Network Interface Card) belonging to a vTVAS instance in the case of vTVAS, or to a physical Ethernet interface belonging to a hardware-appliance type of TVAS. This is a common operation in networking processes. Orchestration systems in data center environments do commonly assign different MACs to different virtual machines on server blades, and hardware appliances do also assign several MAC addresses to their hardware interfaces, for instance when implementing high-availability mechanisms like VRRP. This invention does it at a higher scale where several tens or hundreds of MAC addresses can be assigned to the same virtual or physical interface, but this should not result in any implementation difficulties. Although the amount of ARP traffic will increase, with the bandwidth values used in current network environments, the amount or ARP traffic will still create a negligible load.

At MAC address assignment, the TVAS getting the new MAC address (or rather the operating system hosting it) should send gratuitous ARP messages to inform the layer 2 transport equipment of the location of the MAC. In order to avoid expiration, it should be either ensured that regular traffic uses that same MAC address as source, or gratuitous ARP messages should be sent periodically. Other mechanisms for communicating the location of the MAC address to the layer 2 switching equipment are also possible.

Physical Ethernet ports on the servers, if not able to explicitly configure the required number of MAC address, can use the promiscuous Ethernet mode to get traffic sent to all MACs. As the assigned MACs are made known to the switching infrastructure via gratuitous ARP and as today's Ethernet switches do all implement MAC learning, this will not result in any performance impacts.

The service chain classification unit which assigns the traffic flows to the service chains makes sure that the data packets of the data packet flow are sent to the MAC address of the first service providing module in the chain when the data packets enter the service network domain. The service classification step then results in assigning the MAC address of the first service providing module as destination of the Ethernet frame leaving the service chain classification unit 200. No further processing is needed. As can be deduced from FIG. 3, the service classification should take place both for the uplink and for the downlink direction. The traffic forwarding by the forwarding devices may be carried out according to known layer 2 Ethernet technologies. For the embodiment described above, a common layer 2 domain for all TVAS is required.

It shall be noted that this does not preclude the usage of service networks which extend over geographical areas and/or where several subsets of the service network are interconnected via layer 3 networks. It is possible, and a common practice in data-center and cloud environments, to use encapsulation techniques to achieve that the common layer 2 domain gets extended over several datacenter and otherwise disjoint network segments.

The last service providing module in each chain behaves differently than the other service providing modules in the chain. This last service providing module in a chain behaves like a legacy service providing module where the outgoing packets do not use the destination MAC address derived by arithmetical incrementation of the MAC address of the incoming packets, but where the outgoing packets are routed or forwarded according to legacy layer 3 forwarding mechanisms. This may be a lookup up of the destination IP address in the selection of next-hop, and usage of a MAC address owned by such next-hop.

In case that functional requirements would result in designating as last service providing module in a chain a service providing module which does not have layer 3 capabilities, the chain should be extended by adding a legacy layer 3 router to the chain as egress node. While usually not considered as a service providing module due to the lack of payload processing functionality, a layer 3 router can be used as egress service providing module without any disadvantages.

In the following, it is disclosed how load balancing among different TVAS instances is obtained e.g. when several TVAS are provided to apply a single service.

If a TVAS implementation deployed on one specific piece of hardware is not able to handle all required traffic, and if it is not possible or efficient to utilize more powerful hardware, the common way of fulfilling the requirement is to use multiple instances of the TVAS, i.e. multiple pieces of hardware, in a coordinated way. This can be easily achieved in data center environments, where such instances can be created (and destroyed) in an automatic way by an orchestration system.

Different TVAS have very different processing capacity due to the different relative processing or storage needs of the services their implement.

TVAS capacity is often dependent on the number of flows processed, the amount of throughput processed, the number of subscribers handled or combinations of those. Assuming the same underlying hardware, one particular TVAS A may be able to handle X number of flows, while another TVAS B may be able to handle 100 times X number of flows.

Although up to some point it is possible to deploy different TVAS on different hardware in order to compensate for those capacity differences, this can only compensate small differences in capacity. Especially in cases where the best available hardware is only able to take a portion of the total amount of traffic required, it is likely that the same highest performance hardware is used for both TVAS types, so that the amount of instances needed for each will follow the same proportions as their relative capacity.

Regarding throughput (for instance, megabits/second), the proportion may be similar, but it may also be inverse (i.e. TVAS A handling Y megabits/s and TVAS B handling 1/100 times Y). This implies that the proportion in the number of instances of different TVAS types is also dependent on the actual traffic being handled and may change from network operator to network operator and even within one single network operator over time.

The requirement to be able to handle multiple instances of any TVAS is therefore crucial for any service chaining solution. This invention easily fulfills this requirement, and while ultimately it does nothing else than handling chains with multiple instances of a TVAS as multiple chains, it does allow a very simple way of doing it with several advantages:

- The MAC address ranges used to support multiple instances within one specific service chain (i.e. ordered set of TVAS types) have a common part which can be used to identify that specific service chain
- When TVAS instances are created or destroyed, specific subsets of the traffic move to or from those new instances without any impact on the rest of the traffic which keeps using exactly the same TVAS instances as before. This is a huge advantage versus other legacy solutions where creation or removal of TVAS result in a full redistribution of flow with severe impacts to stateful TVAS.

A preferred embodiment works by:

- Reserving a number of bits from the MAC address range used for service chaining, to support multiple instances.
- Instead of assigning one single MAC address per service chain to the ingress port of each TVAS in that service chain, it does assign all MAC addresses resulting of the permutation through all possible values of those reserved bits
- Those MAC addresses are assigned to the different existing instances of that particular TVAS.
- If new instances are created, MACs are moved from previous instances to the new instance.
- If instances are destroyed, the MACs they had assigned are moved to the remaining instances.
- Note that the amount of bits reserved to support multiple instances may be different from chain to chain. While 5 bits (32 instances) may be a reasonable choice for most chains, nothing precludes an implementation to use none or just 1 or 2 bits for chains unlikely to be overloaded in order to avoid using too many MAC addresses in the network, or to use 8 or more bits where scalability to the hundreds of instances may be required.

Based on the example given above and discussing functions of FIG. 4, an example for multiple instances is explained in connection with FIG. 7.

The MAC range 02:xx:xx:xx:xx:xx is reserved for service chaining. The last four bits of that range are reserved for a TVAS inside a chain. The first service chain may consist of TVAS-A, TVAS-B and PoI-A, the second service chain may consist of TVAS-B, TVAS-A, TVAS-C, PoI-A. Furthermore the scalability up to four instances is assumed to be sufficient for these two chains, and the two leftmost bits of the MAC range are reserved for this. Furthermore, in the embodiment of FIG. 7, two instances of TVAS-A are assumed. The resulting MAC assignments would be as shown in FIG. 7. The upper part of FIG. 7 describes the first service chain, whereas the second service chain is shown in the lower part of FIG. 7.

As shown in FIG. 7, in the second byte of the MAC address, the four instances are described.

As can be seen from the examples above, the possible network address can contain different parts: A first part, the first byte in the example above encoding in its last bit that the address is locally administered. A second part of the address can indicate the direction of flow, in the example above the first bit of the second byte. A third part describes the chain number and can be found in the remaining bits between the second part mentioned above and part four mentioned below. The fourth part describes the service providing module instance within the chain. In the example shown in FIG. 7, the second part is not used as it is not necessary to describe the scalability solution. The third part is further split into two different parts to support load balancing. In the example of FIG. 7, there is a first third part providing the scalability up to four instances per chain and the second third part encoding the actual service chain.

In one embodiment, the address may only have the third part concerning the chain number and the fourth part describing the service providing module number. The second part may also be encoded within the third part.

The scalability of the above-described invention is quite high. It might appear the preferred embodiment to support multiple instances described above wastes a high amount of MAC addresses in comparison to alternative solutions to such multiple-instances-requirement, but a main reason for this is that even which such wasteful usage of MAC addresses, the scalability figures are still high. Basically, the formula determining the scalability is:

$$\#\text{Service-Chains}*\text{Max}(\#\text{TVAS-per-chain})*\text{Max}(\#\text{instances-per-chain}) < 2^{\#bits\_in\_range}$$

In the example used above where there are 40 bits reserved for service chaining this would allow combination like:

8120 service chains with up to 128 TVAS per chain with up to 1 million instances per TVAS Even if it is decided to reserve only 30 bits for this (although it is unlikely that there is any reason to limit the usage of MAC ranges for the locally administered realm), the invention still could support 8120 Chains*128 TVAS*1024 instances per TVAS.

Note that scalability can still go much higher by using up to the full 46 available bits in the MAC range (i.e. using also the 6 leftmost bits of the first octet), or by splitting the ranges among service-chains, TVAS-types and instances differently for different chains. But given the huge scalability even by the most trivial approach, such optimizations are probably not needed.

In practice, the amount of MAC addresses really usable does not depend solely on the address space, but also on the capability of switching equipment to store and handle a high amount of addresses. Current layer 2 switching equipment used in data centers today have a limit of around 32 thousand MAC addresses, due to the limited size of their forwarding tables. On the other hand, the amount of MAC addresses to be handled by the switching equipment is not proportional to the "Maximum amount of . . . " used in the previous formulas but to:

The actual amount of service chains deployed

The average amount of TVAS used per chain

The average maximum amount of instances foreseen (and provisioned) per chain

The lower bound in the worst case situation that all service chains are used, all have highest amount of TVAS and all foresee the highest amount of instances, would still allow for figure like:

32 Service Chains with up to 32 TVAS per chain with up to 32 instances per TVAS but in any real deployment with lower averages, handling hundreds of service chains, tens of TVAS per chain and hundreds of instances per TVAS would be no problem at all.

Adding a legacy TVAS as a "next-TVAS" in a chain should be possible to do without any change at all to the solution. The majority of legacy TVAS do allow assigning additional MAC addresses to their ingress interfaces without need to modify their implementation, or with minor tuning of their underlying operating systems which can be achieved by configuration or patching as opposed to new implementation. If there happens to be TVAS which do not allow this, it is very easy to implement an efficient MAC translation entity which does nothing else than receiving incoming packets sent to all MAC addresses that according to the invention should belong to the legacy TVAS, and replaces the destination MAC addresses with the real MAC address of the legacy TVAS before sending them out. Such translation entity could be a dedicated virtual machine (possibly cohosted with TVAS located before the legacy one in some chains or cohosted with the legacy TVAS), could be an OpenFlow switch or vSwitch, or a dedicated appliance.

The negative impact from using a legacy TVAS in a solution based on this invention comes from the need to re-classify the traffic at the egress of the legacy TVAS in order to send it to the following TVAS in each chain. For this, basically any of the legacy solutions described in the introducing part of the invention could be used, with their advantages and disadvantages.

If choosing an SDN-based approach, then the traffic leaving the legacy TVAS would have to go to an OpenFlow switch which implements flow rules to reclassify the traffic, but which would then forward it to the next MAC address according to this invention instead of using the forwarding steps of the original SDN-based approach.

If choosing a solution based on VLAN/Metadata preservation and using dedicated TVAS instances when they do not support VLAN/Metadata preservation, there are two possibilities.

1. If the legacy TVAS does not support preservation, then the solution is extremely easy and we only need a MAC translation entity also at the egress to distribute the outgoing traffic to all the MAC addresses assigned to the next TVAS in the chain. It may even be possible to avoid such entity by configuring IP addresses as ECMP (Equal Cost Mulitpath) default-gateways and ensuring that ARP queries for those IP addresses result in the desired MAC addresses. It shall be noted that although the cost for this work around is very low, it does inherit a disadvantage of the VLAN/Metadata based service chaining solutions, namely that dedicated TVAS per chain are needed which severely limits the amount of service chains that can be efficiently supported.

2. If the legacy TVAS supports VLAN/Metadata preservation, we can similarly use a translation entity at the ingress and at the egress of the TVAS in order to translate from MAC to VLAN-tag/Metadata and the other way around, and in this manner avoid the need for re-classification.

In order for a service chaining solution based on this invention to be better than a legacy solution, a significant number of TVAS (significant proportion, or specific TVAS handling a significant part of the traffic) shall implement it. The combination with legacy TVAS is still possible.

In the above-described example, the ingress network address of the underlying layer was a layer 2 MAC address. However, the invention can also be utilized by adding encapsulation of the IP packets flowing between service providing modules. Functionally, the framing of layer 3 packets inside layer 2 frames with layer 2 headers is equivalent to encapsulation.

If there are any reasons to prefer a layer 3 solution, like frequent hybrid data center an non-data-center deployments, this invention can also be implemented by adding IP encapsulation (for instance GRE, IP-in-IP, L2TP, . . . ), where the same principles above are applied to a reserved sub-range of the destination IP address of the encapsulated packets instead of to the reserved sub-range of the destination MAC address of the layer 2 frame.

The TVAS would obviously need to support the specific encapsulation and decapsulation to be used, but this is a fairly simple requirement.

For scalability reasons, the usage of IPv6 addresses might be preferred as the available number of bits to assign for different purposes is higher.

It shall be noted that this invention refers explicitly to the functional modification of the destination address, be it the MAC address of the layer 2 frame, or a layer 3 address of an encapsulated packet. The description above explicitly uses arithmetical incrementation, but other predefined relationships may be used.

The usage of functional modifications of other fields than the destination address is out of the scope of this invention (and is fundamentally different), as it would fail to fulfill a main achievement of this invention which is being able to leverage legacy transport infrastructure where forwarding is based on destination address.

Although this section describes a layer 3 embodiment, it shall be noted that the preferred layer 2 embodiment is also appropriate for service networks which extend over geographical areas and/or several subsets of the service network are interconnected via layer 3 networks. It is possible, and commonly used in data-center and cloud environments, to use encapsulation techniques to achieve that a common layer 2 domain gets extended over several datacenter and otherwise disjoint network segments.

Figure 8:
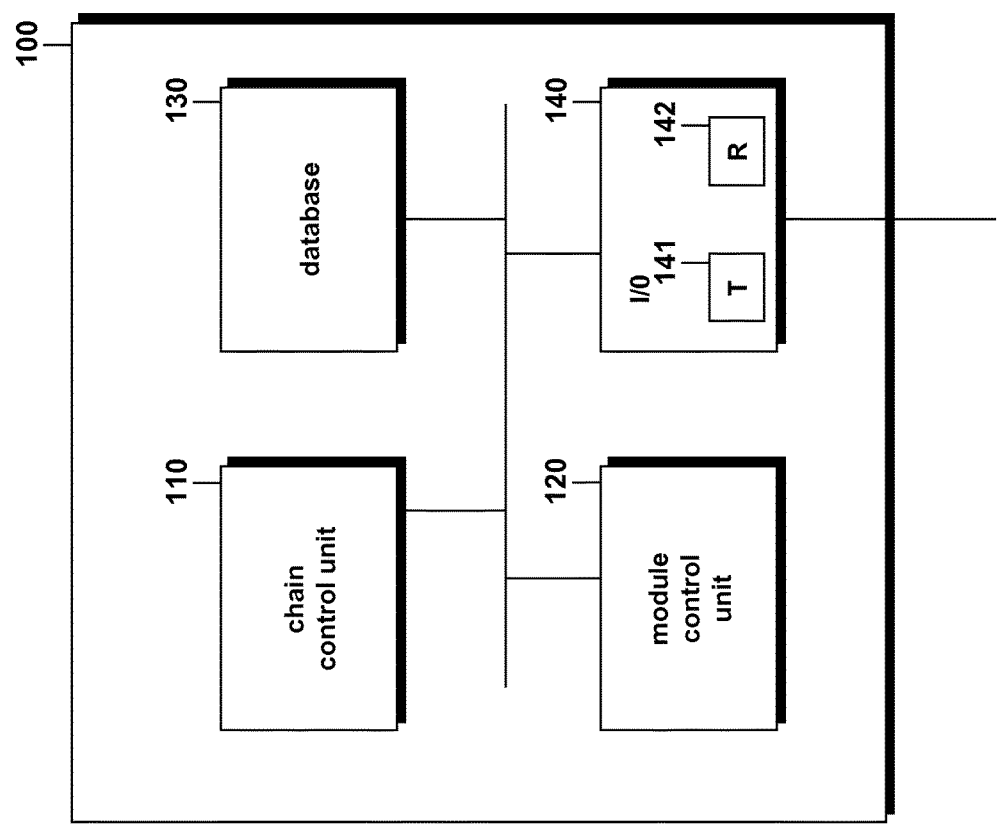
FIG. 8 shows a schematic block diagram of a service control entity incorporating features of the invention.
Figure 9:
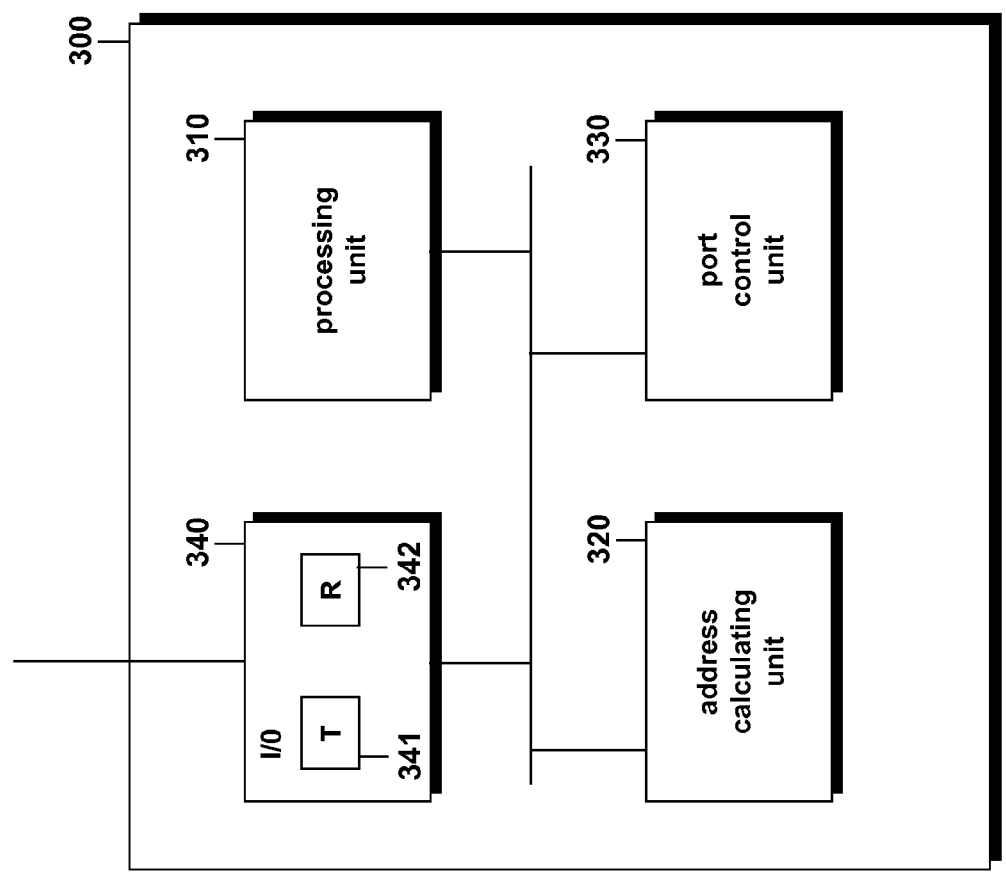
FIG. 9 shows a schematic block diagram of a service providing module incorporating features of the invention.

In connection with FIGS. 8 and 9, the different functional units provided in the service control entities and the service providing modules are discussed in more detail.

FIG. 8 is a schematic block diagram of a service control entity 100 which assigns the network addresses to the service providing modules, identifies the possible chains of services, etc. A chain control unit 110 is provided which determines the possible chains of services, determines for each chain of services which sequence of services is applied to a data packet flow and which service providing modules provide the required chain of services. The module control unit 120 then assigns the ingress network addresses of the underlying layer to the service providing modules. In a database 130 the different possible chains of services may be stored. Furthermore the predefined relationship used by the service providing modules 300 to amend the ingress network address may also be stored in a database. For a communication to other nodes or parts outside the service control entity 100, an input-output unit 140 is schematically shown comprising a transmitter 141 and a receiver 142. It should be understood that the input-output is only a schematic representation and the input-output unit may contain different interfaces which are able to communication with different communication protocols. Furthermore, it should be understood that the service control entity may comprise additional functional entities not shown in the context of FIG. 8. Furthermore, it should be understood that the different functional entities need not be provided in this shown separation of entities. Different functional entities may be incorporated into a single unit or some of the functional units may be incorporated into a single unit, being hardware, software or a combination of hardware and software.

FIG. 9 shows a schematic diagram of a service providing module 300. The service providing module comprises an input-output unit 340, in which schematically a transmitter 341 and a receiver 342 are shown, the transmitter being used to transmit data packets or control signals to the outside, whereas the receiver is used to receive data packets or control signals. The receiver 342 may be inter alia used for the reception of data packets of the data packet flow. A processing unit 310 is provided which is inter alia provided to process the data packets of the received data packet flow in order to apply the service provided by the service providing module 300. An address calculation unit 320 calculates the destination address of the underlying layer based on the ingress network address and based on the predefined relationship. The transmitter 342 transmits the data packets to the next service providing module in the chain of services or, if it is the last service providing module to a gateway or a PoI where the data flow exits the service network. A port control unit 330 assigns the network address to the port of the service providing module.

The general statement made above in connection with FIG. 8 relating to the functional units shown in FIG. 8 also applies to FIG. 9.

Figure 10:
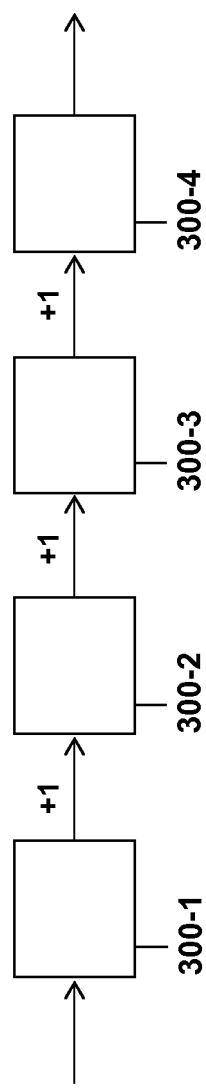
FIG. 10 shows a schematic block diagram of how ingress network addresses are amended based on a predefined relationship in a data packet flow traversing a chain of services.

In connection with FIG. 10, the incrementation of the network address from one service providing module to the next is schematically shown. A data packet flow is received by a first one of the service providing modules 300-1. The data packets may originate from the service chain classification unit 200 which transmitted the data packets of the data packet flow to the first service providing module in a chain, here module 300-1. Module 300-1 applies the needed service and furthermore determines the destination address to which the data packets are passed on. This destination address calculation is based on the predefined relationship, in the example shown is a simple incrementation of the network address by one. The same procedure is carried out in the modules 300-2 and 300-3, meaning that in each of the modules, the predefined relationship is applied to the ingress network address to calculate the destination address and the next-hop. The last service providing module in a chain then does not increment the received network address, but the data packets are routed or forwarded according to legacy layer 3 forwarding mechanisms.

Figure 11:
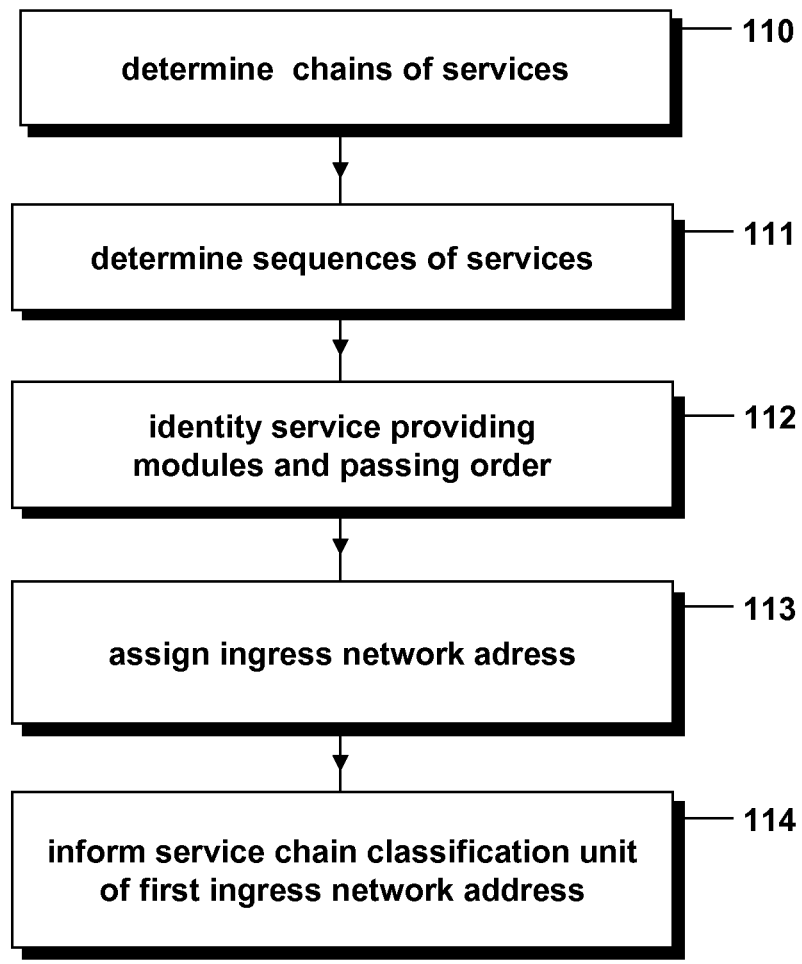
FIG. 11 illustrates a flow chart comprising steps carried out by the service control entity to control a data packet flow through a chain of services.

In connection with FIG. 11, the main steps carried out by a service control entity 100 are summarized. In a first step 110, the possible chains of services are determined within the service network. For each of the determined chains of services, it is determined in step 111 which sequence of services is applied in a chain of services.

In step 112, the service providing modules are identified which can provide, for each chain of services the needed services. Furthermore in step 112, the passing order is determined, meaning it is determined in which order the different service providing modules have to be passed in order to obtain the required sequence of services. It is then possible to assign the ingress network address to the different service providing modules in step 113. The ingress network addresses are assigned in such a way that when each of the service providing modules determines the destination address based on the predefined relationship, the data flow is directed to the correct service providing module in the chain of services. Additionally, in step 114 the service chain classification unit is informed of the first ingress network address provided for each chain of services. With this knowledge, the service chain classification unit can then distribute the incoming data traffic flows to the different chains of services.

Figure 12:
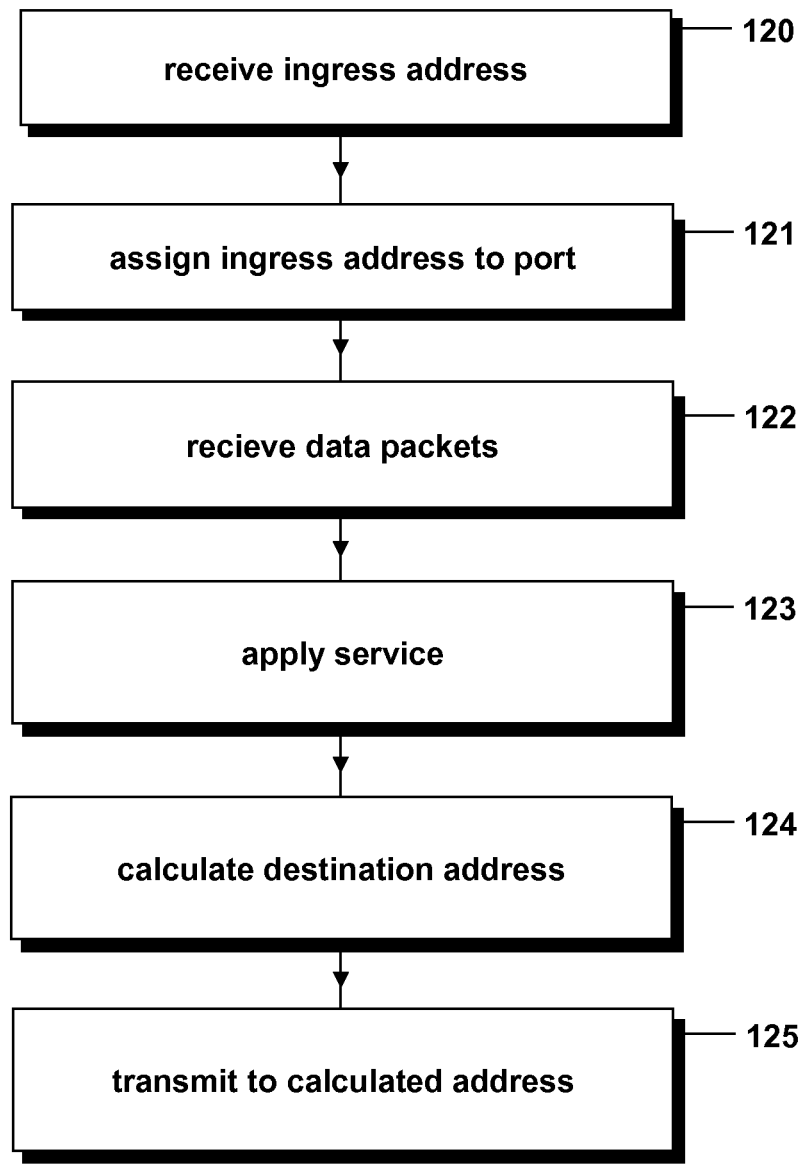
FIG. 12 shows a flow chart comprising steps carried out by the service providing module in a chain of services when a service is applied to the data packet flow.

In connection with FIG. 12, the main steps carried out by the service providing module 300 are summarized. In step 120, the ingress network address as assigned by the service providing module is received. In step 121, the ingress network address is assigned to one of the ports. When a data packet flow is received as shown in step 122, the service providing module can apply the required service in step 123. Before the data packet flow can be passed to the next service providing module, the destination address is calculated in step 124, the calculation using the predefined relationship relating the ingress network address to the destination network address of the next service providing module. Last but not least, in step 124 the data packet flow is transmitted to the calculated destination address in step 125.

The above discussed invention has several advantages. First of all, there are no service chaining specific requirements on the networking infrastructure. There are no additional requirements so that today's legacy layer 2 switches can be used instead of SDN transport equipment, or instead of a complex combination of a high amount of SDN software switches plus passive hardware switches. Furthermore, non-transparent service providing modules are supported without disturbing the service chaining. TVAS implementation can be changed if advantageous to modify IP headers. No additional control entity or control interfaces are needed. Furthermore, virtual TVAS and hardware-appliance TVAS can be easily supported. Additionally, TVAS instances can be created or destroyed while preserving a flow state. When a TVAS instance is created or destroyed, specific subsets of the traffic move to or from those instances without any impact on the rest of the traffic which keeps using exactly the same TVAS instances as before.

The TVAS do not need any kind of awareness of previous or subsequent TVAS in the chains. They are not affected in any way by the addition or removal or the presence of any other TVAS in a chain. As mentioned above, the solution is scalable in all dimensions, the number of TVAS, the number of instances per TVAS and number of different chains. Furthermore, the TVAS can be chained in any order and uplink and downlink arbitrary chains are supported in addition to the common case of symmetric chains. This can be useful in case of unidirectional TVAS being part of the service chain in one direction while being left out in the opposite direction. MTU (Maximum Transmission Unit) issues are fully avoided (in the preferred embodiment, i.e. layer 2) as the packet size does not increase.

The invention claimed is:

1. A service controller of a service network configured to control chains of services provided in the service network in which a plurality of service providing nodes operate, wherein data packets of a data packet flow from a source address to a destination address are transmitted through the service network to apply a chain of services to the data packet flow, wherein in a chain of services a predefined sequence of services is applied to the data packet flow, an end-to-end layer being used to steer the data packet flow from the source address to the destination address, wherein different data packet flows are transmitted through the service network to apply a flow dependent chain of services to the corresponding data packet flow, the service controller comprising:
    a memory,
    a processor coupled to the memory, the processor configured to:
    determine the possible chains of services to be applied to the different data packet flows, and configured to identify, for each chain of services, the predefined sequence of services applied to the data packet flow when passing through the corresponding chain of services,
    identify, for each chain of services, the service providing nodes of the service network which provide the services contained in the predefined sequence of services, and to identify in which order the identified service providing nodes have to be passed in order to apply the predefined sequence of services to the data packet flow,
    determine a predefined range of possible network addresses of an underlying layer of the end-to-end layer to assign to the identified service providing nodes of the service network which provide the services contained in the predefined sequence of services, and
    assign, to each of the identified service providing nodes contained in the chain of services, an ingress network address from the predefined range of network addresses of an underlying layer of the end-to-end layer, which is used in the service network to direct the data packet flow to the next service providing node of the chain of services, wherein the processor is further configured to assign ingress network addresses to the service providing nodes used in the corresponding chain of services so that the ingress network address of a service providing nodes and the ingress network address of a neighboring service providing node which is the subsequent service providing node in the corresponding chain of services, are related to each other by a predefined incremental relationship of the predefined range of network addresses, and
    inform, using a transmitter of the service controller, a service chain classification node of the service network which identifies the data packet flows entering the service network and identifies the service chain to be applied to each data packet flow, of the ingress network address of the predefined range of network addresses of the first service providing node provided in each chain of services.

2. The service controller according to claim 1, wherein the processor is further configured to use within the predefined range a sub-range of the predefined range for each of the possible chains of services.

3. The service controller according to claim 1, wherein the processor is further configured to control the service providing nodes, in each of the chain of service, so that the service providing nodes use the predefined incremental relationship to modify the ingress network address of the underlying layer contained in the data packets of the received data packet flow based on the predefined incremental relationship and use the modified ingress network address, modified according to the predefined incremental relationship, as destination network address of the underlying layer to forward the data packet flow to the next service providing node of the chain of services.

4. The service controller according to claim 1, wherein the processor is further configured to control the last service providing node passed by the data packet flow in each chain of services, so that the last service providing node in each chain of services, discards the ingress destination address in the data packets of the received data packet flow and forwards the data packets of the received data packet flow taking into account the destination address of the end-to-end layer.

5. The service controller according to claim 2, wherein each address of the predefined range of possible network addresses comprises multiple parts, the multiple parts comprising: a part indicating that the network address of the underlying layer is locally administered within the service network, a part indicating the flow direction of the data packet flow within the service network, a part identifying the chain of services, a part containing the predefined range of network addresses of the underlying layer used by a chain of services.

6. The service controller according to claim 1, wherein the processor is further configured to:
determine, in each chain of services, a maximum number of service providing nodes, which are used within a chain of services to provide a single service,
assign, to the first service providing node in each chain of services, as many ingress network addresses as the determined maximum number of service providing nodes.

7. The service controller according to claim 1, wherein the predefined range of possible network addresses comprise a predefined range of Ethernet MAC addresses; and wherein the ingress network address of the underlying layer is an Ethernet MAC address of the predefined range of Ethernet MAC addresses.

8. The service controller according to claim 1, wherein the predefined range of possible network addresses comprise a predefined range of encapsulated end-to-end layer addresses; and wherein the ingress network address of the underlying layer is an encapsulated end-to-end layer address of the predefined range of encapsulated end-to-end layer addresses added to the data packet flow.

9. A method, performed by a service controller, to control chains of services provided in a service network in which a plurality of service providing nodes are provided, wherein data packets of a data packet flow from a source address to a destination address are transmitted through the service network to apply a chain of services to the data packet flow, wherein in a chain of services a predefined sequence of services is applied to the data packet flow, an end-to-end layer being used to steer the data packet flow from the source address to the destination address, wherein different data packet flows are transmitted through the service network to apply a flow dependent chain of services to the corresponding data packet flow, the method comprising the steps of:
determining the possible chains of services to be applied to the different data packet flows,
identifying, for each chain of services, the predefined sequence of services applied to the data packet flow when passing through the corresponding chain of services,
identifying, for each chain of services, the service providing nodes which provide the services contained in the predefined sequence of services,
identifying in which order the identified service providing nodes have to be passed in order to apply the predefined sequence of services to the data packet flow,
determining a predefined range of possible network addresses of an underlying layer of the end-to-end layer to assign to the identified service providing nodes of the service network which provide the services contained in the predefined sequence of services,
assigning, to each of the identified service providing nodes contained in the chain of services, an ingress network address from the predefined range of network addresses of an underlying layer of the end-to-end layer, which is used in the service network to direct the data packet flow to the next service providing node of the chain of services, wherein assigning further comprises assigning ingress network addresses to the service providing nodes used in the corresponding chain of services so that the ingress network address of a service providing nodes and the ingress network address of a neighboring service providing node which is the subsequent service providing node in the corresponding chain of services, are related to each other by a predefined incremental relationship of the predefined range of network addresses, and
informing a service chain classification node of the service network which identifies the data packet flows entering the service network and identifies the service chain to be applied to each data packet flow, of the ingress network address of the predefined range of network addresses of the first service providing node provided in each chain of services.

10. The method according to claim 9, wherein the service providing nodes, in each of the chain of service, are controlled so that the service providing nodes use the predefined incremental relationship to modify the ingress network address of the underlying layer contained in the data packets of the received data packet flow based on the predefined incremental relationship and use the modified ingress network address, modified according to the predefined incremental relationship, as destination network address of the underlying layer to forward the data packet flow to the next service providing node of the chain of services.

11. The method according to claim 9, wherein in each chain of services, a maximum number of service providing nodes which are used within a chain of services to provide a single service is determined, and, as many ingress network addresses as the determined maximum number of service providing nodes are assigned to the first service providing node in each chain of services.

12. A service providing node configured to provide a service to a data packet flow in a service network in which a plurality of service providing nodes are provided, wherein data packets of a data packet flow from a source address to a destination address are transmitted through the service network to apply a chain of services to the data packet flow, wherein in a chain of services a predefined sequence of services is applied to the data packet flow, an end-to-end layer being used to steer the data packet flow from the source address to the destination address, wherein different data packet flows are transmitted through the service network to apply a flow dependent chain of services to the corresponding data packet flow, the service providing node comprising:

a memory, a processor coupled to the memory, the processor further configured to:

receive data packets of one of the data packet flows, the data packets including an ingress network address of a predefined range of possible network addresses of an underlying layer of the end-to-end layer, which is used in the service network as ingress address to direct the data packet flow to the service providing node, process the data packets of said one data packet flow in order to apply the service provided by the service providing node, wherein the processor is further configured to apply, the service to the data packets to maintain the ingress network address of the underlying layer, calculate a destination address of the underlying layer of the next service providing module to which the data packet flow is to be transmitted in the chain of services based on the ingress network address of the underlying layer and based on a predefined incremental relationship between the ingress network address contained in the data packets of the received data packet flow and the destination address of the underlying layer of the predefined range of possible network addresses, and transmit the data packets of the data packet flow to the next service providing node in the chain of services using the calculated destination address of the underlying layer of the next service providing node.

13. The service providing node according to claim 12, wherein the processor is further configured to:

pass up the ingress network address of the underlying layer to the end-to-end layer, and pass the calculated destination address down to the underlying layer where it is used as destination address for the data packets of the data packet flow.

14. The service providing node according to claim 12, wherein the processor is further configured to:

assign a network address of the underlying layer to a port of the service providing module, and, assign an ingress network address from the predefined range of possible network addresses to one of the ports of the service providing node when a command is received for assigning a network address to a port including the ingress network address to be assigned.

15. The service providing node according to claim 14, wherein the processor is further configured to transmit the assigned network address from the predefined range of possible network addresses to forwarding devices of the service network informing the forwarding devices of the service network of the port to which the network address was assigned.

16. The service providing node according to claim 12, wherein the processor is further configured to:

add an encapsulated end-to-end layer address as destination address from the predefined range of possible network addresses to the received data packets before the data packets of the data packet flow are transmitted to the next service providing module in the chain of services based on the encapsulated end-to end-layer address, and remove the encapsulation in the data packets of the received data packet flow before the service is applied to the data packets of the received data packet flow.

17. A method, performed by a service providing node, to provide a service to a data packet flow in a service network in which a plurality of service providing nodes are provided, wherein data packets of a data packet flow from a source address to a destination address are transmitted through the service network to apply a chain of services to the data packet flow, wherein in a chain of services a predefined sequence of services is applied to the data packet flow, an end-to-end layer being used to steer the data packet flow from the source address to the destination address, wherein different data packet flows are transmitted through the service network to apply a flow dependent chain of services to the corresponding data packet flow, the method comprising the steps of:

receiving data packets of one of the data packet flows, the data packets including an ingress network address of a predefined range of possible network addresses of an underlying layer of the end-to-end layer, which is used in the service network as ingress address to direct the data packet flow to the service providing node, processing the data packets of said one data packet flow in order to apply the service provided by the service providing node, wherein the ingress network address of the underlying layer is maintained after the processing, calculating a destination address of the underlying layer of the next service providing module to which the data packet flow is to be transmitted in the chain of services, wherein the destination address is calculated based on the ingress network address of the underlying layer and based on a predefined incremental relationship providing a relationship between the ingress network address contained in the data packets of the received data packet flow and the destination address of the underlying layer of the predefined range of possible network addresses, and transmitting the data packets of the data packet flow to the next service providing node in the chain of services using the calculated destination address of the underlying layer of the next service providing node.

18. The method according to claim 17, wherein the ingress network address of the underlying layer is passed up to the end-to-end layer of the service providing node, and the calculated destination address is passed down to the underlying layer where it is used as destination address for the data packets of the data packet flow.

19. The service controller according to claim 3, wherein the processor is further configured to control the service providing nodes, in each of the chain of service, so that the service providing nodes increment a value of ingress network address based on the predefined incremental relationship to determine a destination network address of the underlying layer to forward the data packet flow to the next service providing node of the chain of services.

20. The service providing node according to claim 12, wherein the processor is further configured to calculate the destination network address of the predefined range of possible network addresses by incrementing a value of the ingress network address by the predefined incremental relationship.

* * * * *